United States Patent [19]

Moreton

[11] Patent Number: 5,506,624
[45] Date of Patent: Apr. 9, 1996

[54] ROTATING SAMPLE OF VIDEO IMAGES

[75] Inventor: Henry P. Moreton, Oakland, Calif.

[73] Assignee: Silicon Graphics, Inc., Mountain View, Calif.

[21] Appl. No.: 281,753

[22] Filed: Jul. 28, 1994

[51] Int. Cl.$^6$ .................................................... H04N 7/36
[52] U.S. Cl. ............................. 348/420; 348/409; 348/19
[58] Field of Search ................................ 348/13, 15, 17, 348/19, 401, 409, 412, 415, 384, 420, 421, 408, 399; 382/250, 282; 358/433

[56] References Cited

U.S. PATENT DOCUMENTS

| | | | |
|---|---|---|---|
| 4,546,383 | 10/1985 | Abramatic et al. | 348/19 |
| 5,285,276 | 2/1994 | Citta | 348/409 |
| 5,389,965 | 2/1995 | Kuzma | 348/17 |

OTHER PUBLICATIONS

Heckbert, "Recording Animation in Binary Order for Progressive Temporal Refinement" in *Graphics Gems*, Table of contents and 265–269 (A. S. Glassner ed. 1990).

*Primary Examiner*—Tommy P. Chin
*Assistant Examiner*—A. Au
*Attorney, Agent, or Firm*—Blakely, Sokoloff, Taylor & Zafman

[57] ABSTRACT

A computer-implemented method of transmitting images from a transmitter to a receiver (e.g. in a teleconferencing application). A receiver maintains an image in a local storage (e.g. that from a previous frame in a sequence of frames) and the transmitter receives an updated image for a next temporal period (e.g. the next frame). The transmitter divides the updated image into blocks and comparing a rotating pixel sample(s) of each of the blocks from the updated image with a sampled pixel from a local copy of a receiver's image at a same spatial position of the pixel sample(s). The transmitter determines a difference between the rotating sampled pixel of each of the blocks from the updated image and the local copy of the receiver's image. It stores a reference to the block and associates the difference with the reference. The difference is an average absolute difference in luminance between the two blocks. The transmitter sorts each of the blocks by the difference using the reference into a list of sorted blocks and associated differences. The transmitter then transmits each of the blocks to the receiver in order of greatest difference to smallest difference until a threshold is reached. The threshold may be a difference threshold, or a maximum number of transmitted blocks, according to bandwidth constraints.

6 Claims, 9 Drawing Sheets

| 170 | 106 | 154 | 90 | 166 | 102 | 150 | 86 | 169 | 105 | 153 | 89 | 165 | 101 | 149 | 85 |
|---|---|---|---|---|---|---|---|---|---|---|---|---|---|---|---|
| 42 | 234 | 26 | 218 | 38 | 230 | 22 | 214 | 41 | 233 | 25 | 217 | 37 | 229 | 21 | 213 |
| 138 | 74 | 186 | 122 | 134 | 70 | 182 | 118 | 137 | 73 | 185 | 121 | 133 | 69 | 181 | 117 |
| 10 | 202 | 58 | 250 | 6 | 198 | 54 | 246 | 9 | 201 | 57 | 249 | 5 | 197 | 53 | 245 |
| 162 | 98 | 146 | 82 | 174 | 110 | 158 | 94 | 161 | 97 | 145 | 81 | 173 | 109 | 157 | 93 |
| 34 | 226 | 18 | 210 | 46 | 238 | 30 | 222 | 33 | 225 | 17 | 209 | 45 | 237 | 29 | 221 |
| 130 | 66 | 178 | 114 | 140 | 78 | 190 | 126 | 129 | 65 | 177 | 113 | 141 | 77 | 189 | 125 |
| 2 | 194 | 50 | 242 | 14 | 206 | 62 | 254 | 1 | 193 | 49 | 241 | 13 | 205 | 61 | 253 |
| 168 | 104 | 152 | 88 | 164 | 100 | 148 | 84 | 171 | 107 | 155 | 91 | 167 | 103 | 151 | 87 |
| 40 | 232 | 24 | 216 | 36 | 228 | 20 | 212 | 43 | 235 | 27 | 219 | 39 | 231 | 23 | 215 |
| 136 | 72 | 184 | 120 | 132 | 68 | 180 | 116 | 139 | 75 | 187 | 123 | 135 | 71 | 183 | 119 |
| 8 | 200 | 56 | 248 | 4 | 196 | 52 | 244 | 11 | 203 | 59 | 251 | 7 | 199 | 55 | 247 |
| 160 | 96 | 144 | 80 | 172 | 108 | 156 | 92 | 163 | 99 | 147 | 83 | 175 | 111 | 159 | 95 |
| 32 | 224 | 16 | 208 | 44 | 236 | 28 | 220 | 35 | 227 | 19 | 211 | 47 | 239 | 31 | 223 |
| 128 | 64 | 176 | 112 | 140 | 76 | 188 | 124 | 131 | 67 | 179 | 115 | 143 | 79 | 191 | 127 |
| 0 | 192 | 48 | 240 | 12 | 204 | 60 | 252 | 3 | 195 | 51 | 243 | 15 | 207 | 63 | 255 |

FIG. 9

ROTATING SAMPLE OF VIDEO IMAGES

BACKGROUND OF THE INVENTION

1. Field of the Invention

The present invention relates to video processing. More specifically, the present invention relates to a method and apparatus for performing a rotating sample of locations in an image, which is especially useful for a computationally inexpensive transmission of a sequence of images from a transmitter to a receiver using a temporal redundancy compression technique.

2. Background Information

The proliferation of computer systems which provide higher quality imagery at lower cost has resulted in a demand for applications such as video conferencing. Due to the large amount of data which must be transmitted in such applications at real time or near real time rates, there has increased a need for a means for reducing the amount of data transmitted between computer systems due to the upper limits of communication media between computer systems. Many prior art solutions to such data reduction, also known as compression, rely upon computationally-expensive means. An overview of some of these techniques will now be discussed.

In general, video conferencing involves the transmission and reception of video images and audio information. In a typical application, multiple users of a video conferencing system view the conference on a display screen and are themselves viewed by camera typically attached to the display. Conferences can be carded out over a number of communication media, including ISDN connections or local area networks (LANs), referred to as "links." As previously discussed, because of the low bandwidth of such links in relation to typical full screen resolution and full frame rate of moving imagery (e.g., 30 frames per second at 640×480 pixel resolution), some sort of compression needs to be performed on the data in order to allow transmission.

One prior approach to compression is generally referred to as selective update. Selective update is a technique wherein portions of an image are transferred between a transmitter and a receiver that have changed from a previous time period (e.g., a previous frame). This results in reducing the amount of data being transmitted. These types of algorithms generally reduce the amount of temporal redundancy. These techniques take advantage of the similarities between images or among sequence of images. Yet another approach to the compression of images are those which exploit spatial redundancy. These algorithms typically transform an image into a format which can be more compactly described for transmission. On reception of such an image the receiver (or decompressor) reverses the transformation required for display. For example, the video teleconferencing standard P*64 uses a combination of temporal and spatial compression techniques to compress a video bit stream.

A variety of techniques for reducing the data in video bit streams based on temporal redundancy, spatial redundancy, or a combination of both, are present in the prior art. For example, the CCIR 601 4:2:2 standard uses a spatial redundancy technique to compress a single video frame. The CCIR 601 standard exploits the fact that the human eye is less sensitive to changes in chrominance than to changes in luminance. CCIR 601 pixels change luminance every pixel but change chrominance only every other pixel. The human eye is also insensitive to higher frequencies, tending to average rapidly changing pixel values. Dithering algorithms exploit the human eye's averaging ability. Dithering trades spatial resolution for color or intensity resolution, representing an image such that over a given area its average intensity or color is correct. More sophisticated approaches to compression filter high frequencies of image data removing data and/or image information unnoticed by the human eye. Such schemes typically filter high frequencies by first dividing the image into tiles such as 4×4 or 8×8 pixels, and filtering the tiles individually.

Temporal redundancy technique exploit the redundancy and sequences of images over time. These schemes take advantage of the fact that in many video applications such as video conferencing there are typically large portions of the transmitted image which do not change significantly from frame-to-frame. More elaborate schemes attempt to estimate the motion in a moving picture such as when a camera pans from left to right. These techniques are known generally as motion estimation algorithms. Motion estimation relies upon translating and copying portions of an earlier frame and only selectively updating those pixels which have changed to construct a frame.

Yet other techniques for removing both temporal and spatial redundancy use even more sophisticated techniques such as vector quantization, wherein similar data either spatially or temporally, is arranged into a code book and similar portions of the image are transmitted based upon code book indices. Again, techniques such as those discussed above, or those utilizing vector quantization tend to be computationally expensive. These prior art processes present a substantial load on the devices, and pose a substantial upper limit on the performance of such techniques. In a multi-tasking environment (e.g. a computer workstation), the processor cannot be completely consumed by such an application due to the need to perform other tasks. Therefore, what is desired is a low cost compression scheme that alleviates some of this load, but yet, provides acceptable image quality for applications such as video teleconferencing.

SUMMARY AND OBJECTS OF THE PRESENT INVENTION

One of the objects of the present invention is to provide an efficient technique for video compression.

Another of the objects of the present invention is to provide a low cost and computationally inexpensive means for video compression/decompression.

Yet another of the objects of the present invention is to provide a video compression/decompression scheme which exploits redundancy in sequences of images, however, does not require a substantial load on underlying compression/decompression devices.

These and other objects of the present invention are provided for by a computer-implemented method of transmitting images from a transmitter to a receiver (e.g. in a teleconferencing application). A receiver maintains a current image in a local storage and the transmitter receives an updated image for a subsequent time period (e.g. the next frame in a sequence of frames). The transmitter divides the updated image into blocks of n×n pixels. The transmitter compares a rotating pixel sample of each of the blocks from the updated image with a sampled pixel from a locally-stored copy of the current image in the receiver at a same spatial position in the block of the pixel sample. The transmitter determines a difference between the rotating pixel sample of each of the blocks from the updated image and the local copy of the receiver's image and stores a reference to the block. In implemented embodiments, the difference is an average absolute difference in luminance between the two blocks. The transmitter sorts each of the blocks according to the difference into a list of sorted blocks and associated differences. The transmitter then transmits each of the blocks to the receiver in order of greatest difference to smallest of difference until a threshold is reached. In implemented embodiments, the threshold may be a difference threshold (e.g. in luminance), or a maximum number of transmitted blocks according to bandwidth constraints. The receiver receives each of the blocks and updates the current image stored in the local storage by replacing each referenced block in the current image with each the received block to create an updated image and then displays the updated image.

These and other objects of the present invention are further provided for by a computer-implemented method of sampling blocks of an image having pixels arranged in two axes (e.g. columns and rows). Note that the sampling is enabled by using a precalculated array of sample positions which has the number of pixels in the block. A counter is maintained which has as a maximum value a total number of the pixels of the block minus one. An XOR operation is performed on pairs of bits in the counter in order to generate a first value. Alternating bits in the first value are bit reversed in order to generate a second value, the second value used to reference a pixel sample at a first of the axes in the image (e.g. a row). Alternating bits in the counter are also bit reversed in order to generate a third value, the third value used to reference the pixel sample at a second of the axes in the image (e.g. a column). The pixel sample is then sampled by addressing the pixel at the second value in the first axis, and the third value in the second axis, such as for use during video processing (e.g. rendering and/or determining differences for compression applications). The counter is incremented and the above-steps are repeated for each sampled pixel, until an overflow (when the counter exceeds its maximum value) and reset of the counter occurs, and the process repeats.

Other objects, features and advantages of the present invention will be apparent from the description and figures which follow below.

BRIEF DESCRIPTION OF THE DRAWINGS

The present invention is illustrated by way of example and not limitation in the figures of the accompanying in which like references indicate like elements and in which:

FIG. 9 illustrates the sequence of rotating samples in a 16×16 pixel block using embodiments of the present invention.

DETAILED DESCRIPTION

Figure 1:
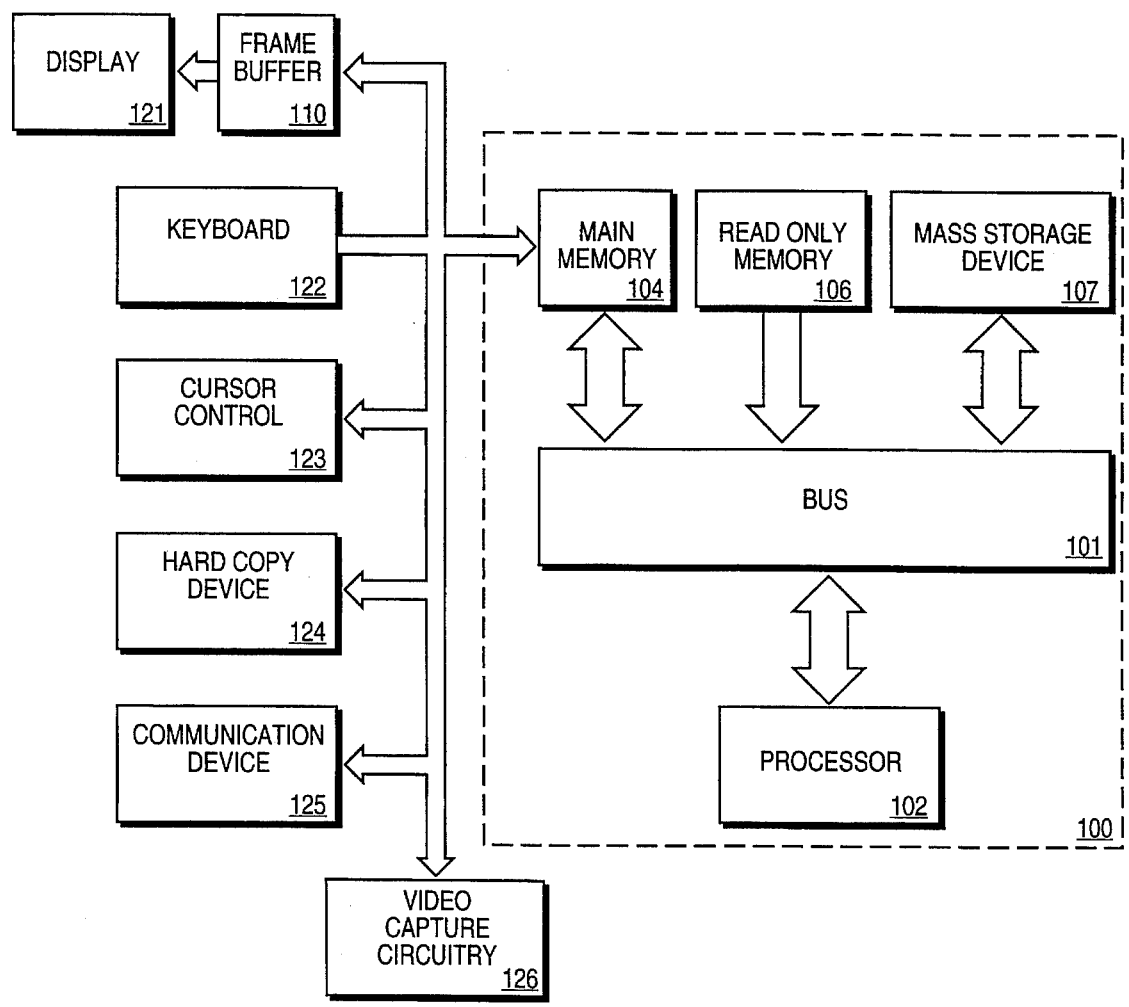
FIG. 1 illustrates a computer system which may be used for either transmitter or receiver circuitry in embodiments of the present invention.

The present invention relates to video processing. More specifically, the present invention relates to a method which determines changes from frame-to-frame in a sequence of moving images. This is accomplished by examining a rotating sample of pixels in individual blocks of the images to determine whether each block has changed sufficiently to warrant transmission of an update block to generate an updated image. The present invention is especially useful for the transmission of a sequence of images between a transmitter and a receiver, for example, two computer systems used for a real-time video teleconference. The present invention has unique advantages over the prior art, including, but not limited to, consuming less computational resources than prior art methods of video compression. The present invention is operative within a transmitter and receiver, specifically, two computer systems, an example of each which is shown in FIG. 1. Although the present invention is described with reference to some very specific implementations, these are to be viewed in the illustrative sense only, and not restrict the present invention. It can be appreciated by one skilled in the art that many departures, modifications and other changes may be made by one skilled in the art, without departing from the overall spirit and scope of the present invention.

Referring to FIG. 1, a system upon which one implementation of the present invention is implemented is shown as 100. 100 comprises a bus or other communication means 101 for communicating information, and a processing means 102 coupled with bus 101 for processing information. System 100 further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. System 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions.

System 100 may further be coupled to a display device 121, such as a cathode ray tube (CRT) or liquid crystal display (LCD) coupled to bus 101 for displaying information to a computer user. Such a display 121 may further be coupled to bus 101 via a frame buffer 110, which information such as a single or multiple frames or images for display upon display device 121. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121.

In addition, computer system 100 may further be coupled to a communication device 125 which comprises a network connection circuitry, a serial port coupled to a modulator/demodulator (modem), or other type of communication device for communicating with other computer systems over an appropriate communication medium. In addition, computer system may further have coupled to it a video capture circuit 126 which samples moving imagery from a video camera at regular intervals (e.g., 30 frames per second), for digitizing, storage, and transmission of moving video imagery. The block diagram of FIG. 1 is shown for illustration purposes only and any configuration of system which may be appropriate for particular application may be used. Any or all of the components of system 100 and associated hardware may be used in various embodiments, however, it can be appreciated that any configuration of the system may be used for various purposes according to the particular implementation (e.g. teleconferencing).

In one embodiment, system 100 is a workstation such as the Indy brand workstation manufactured by Silicon Graphics Computer Systems of Mountain View, Calif. Processor 102 may be one of the R4000 brand microprocessors manufactured by MIPS Technology Corporation of Mountain View, Calif. (Indy, MIPS, and Silicon Graphics are trademarks of Silicon Graphics Computer Systems of Mountain View, Calif.).

Note that the following discussion of various embodiments discussed herein will refer specifically to a series of routines which are generated in a high-level programming language (e.g., the C language) and compiled, linked, and then run as object code in system 100 during run-time. It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 2:
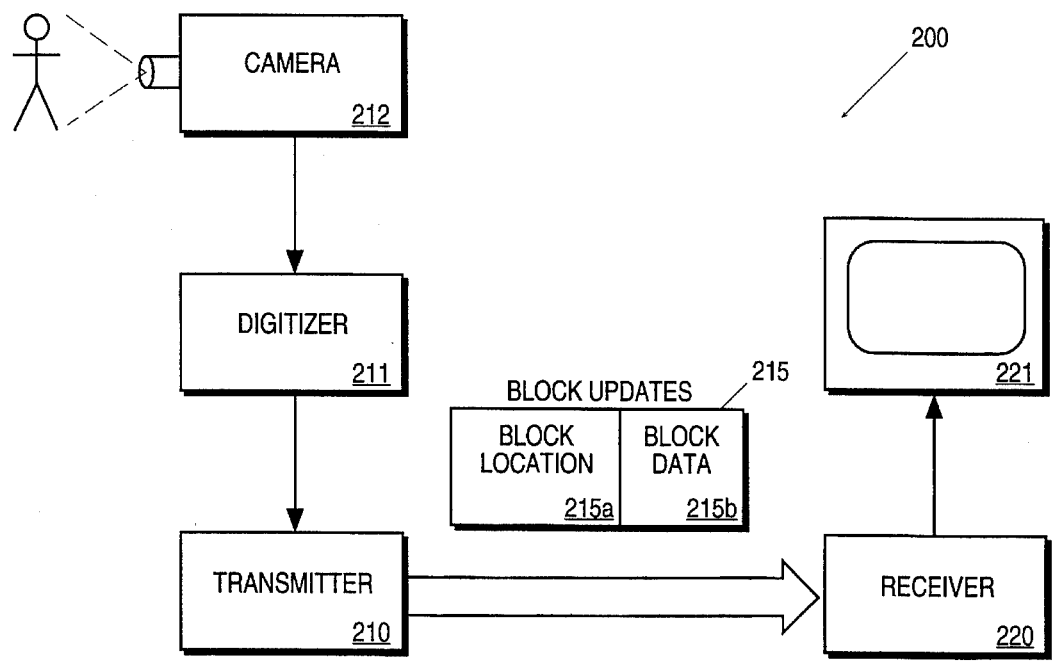
FIG. 2 illustrates a block diagram of a system which has a transmitter and a receiver in a teleconferencing application.

FIG. 2 illustrates a typical teleconferencing system configuration in which a transmitter 210 transmits block updates of new images to a receiver 220. Transmitter 210 obtains sequences of images via camera 212 which are digitized at the desired frame rate by digitizer 211 and which are then processed by transmitter 210. Transmitter 210 initially transmits, upon a scene change or commencement of the teleconference, a complete frame of information which is decomposed into blocks of pixels of a fixed size (e.g., 4×4 or 8×8) to a receiver 220. Receiver 220 maintains a copy of the current frame of data within a local store. The local store is then updated via block updates such as 215 received from transmitter 210. The update blocks 215 are referred to by spatial position in the stored current frame. In this way, an updated frame is constructed in the receiver 220 and may be then transmitted to display 221 at the desired frame rate (e.g., 15 or 30 frames per second). Block updates such as 215 are transmitted based upon changes in luminance between the current block from the current frame and the block at the same spatial position in a local copy of the receiver's image stored in the transmitter. The transmitter should maintain a local copy of the receiver's currently-stored image in order to determine the difference between the receiver's displayed image and the updated image received from the digitizer. This enables the transmitter to determine which blocks require updating in the receiver according to differences between it and the updated image, and prevents drifting which may occur if the actual frame from the previous time period is used. Thus, both the transmitter and receiver should maintaining local copies of the currently-displayed image in the receiver. Both also perform updates via update blocks such as 215 to remaining consistent with one another.

Each block update contains a first portion 215a which indicates the spatial location of the block to be updated. Alternatively, block data can be transmitted in scan order preceded by a skip code x in field 215a indicating that the next x blocks should be skipped prior to performing a block update. The second portion 215b of the block contains the pixel data for the block to be updated. The details of determining differences in luminance between the block for a current frame and the block at the same spatial location from the local copy of the receiver's image (that displayed a previous time period on the receiver's display) will now be discussed.

Figure 3:
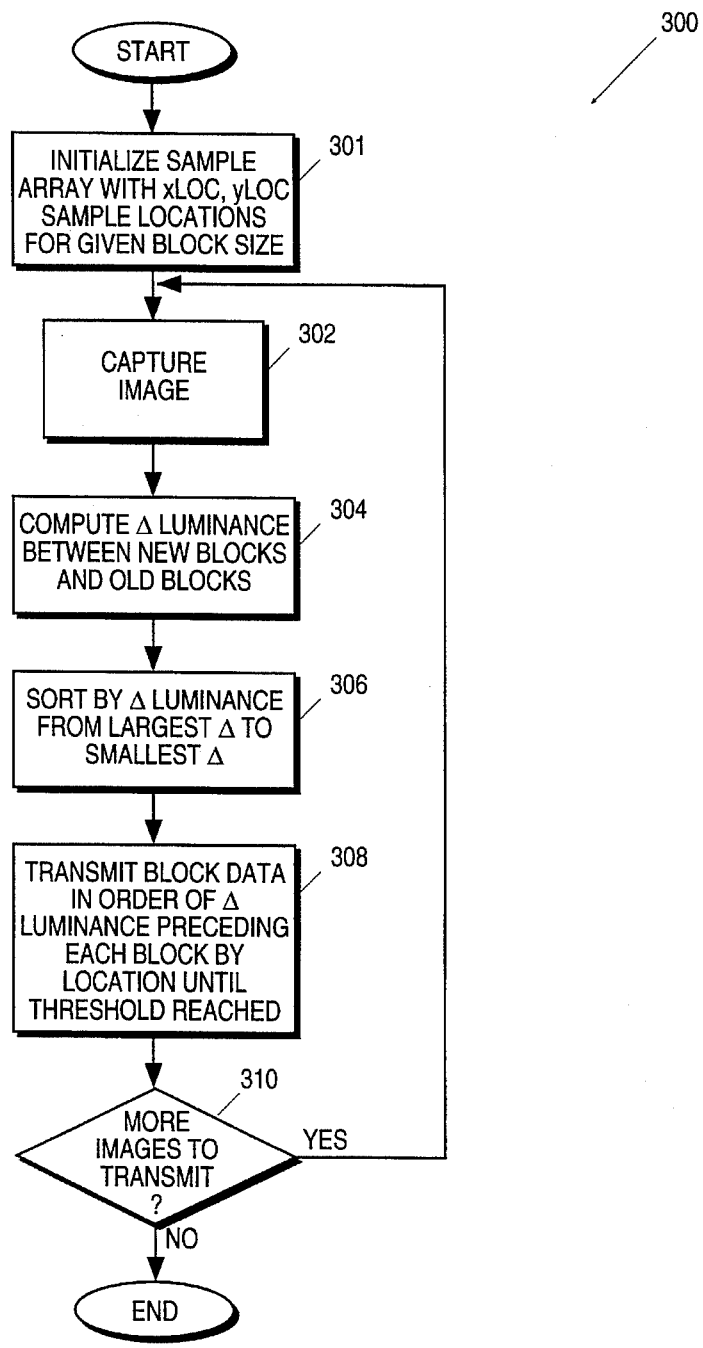
FIG. 3 illustrates a flow chart of a process for transmitting data from a transmitter to a receiver.

FIG. 3 illustrates a process 300 which is performed by transmitter 210. The transmitter uses an array of pre-stored positions in which to sample pixels in each block for changes. The array is entitled SAMPLE_ARRAY[ ]. Each element in SAMPLE_ARRAY[ ], in this embodiment, contains 2 values—one for referencing the x position or column of the pixel in the block, and a second for referencing the y position or row. To conserve processing resources, the array is initialized prior to the teleconference, preferably as soon as the block size is determined, at step 301 as shown in FIG. 3.

Steps 302–310 are cyclically performed upon a sequence of images for as many images as are required (e.g. for the duration of a teleconference). These steps are performed at the rate which is desired for the given application, typically, either 15 or 30 frames per second. This rate may vary according to implementation, however. Process 300 starts at step 302 wherein the video image of the current frame is captured. Then the change in luminance (Δ luminance) is computed using a current digitized block and the transmitter's copy of the receiver's currently-stored block at step 304. In embodiments of the present invention, images are divided into fixed-sized blocks such as 4×4 or 8×8 pixels, and the change in luminance for the block is calculated at step 304. In embodiments of the present invention, the difference for a block is determined using the difference in luminance between selected pixel(s) in the current frame and the locally-stored copy of the receiver's frame displayed a previous time period although another type of difference measure may be used. Determining the difference for an entire block based on selected pixel(s) is known, for the remainder of this application, as rotational subsampling. The selected pixel(s) are determined using the previously initialized array of sample positions SAMPLE_ARRAY[ ].

Implemented embodiments of the present invention, digitize the input image into an eight bit RGB encoding wherein three bits are used to represent red, three bits are used to represent green, and two bits are used to represent blue. The eight bit RGB value may be converted to luminance (or chrominance, or any other value used for determining differences) via a look-up table. Because there is a maximum of 256 different luminance values for an eight bit RGB value, a look-up table seeded with 256 different luminance values, using a well-known luminance transformation function, which may be accessed using the input eight bit RGB value. Upon receipt of the color values from both the locally-stored copy of the receiver's frame and the current frame, luminance values may be computed for each, and the difference may be determined at step 304.

Once the difference in luminance for each block has been determined between the update frame and the current frame, at step 306, the update block in the current image is effectively sorted from largest difference in luminance to smallest using a bucket sort. Alternatively, the sort may be performed after all differences for all update blocks have been calculated, placing the block into the appropriate order into the list to be transmitted. This may have the disadvantage that it consumes more processing power, and requires retention of the difference. In either event, location of the block and the data for the new block are then stored for transmission in the proper order in the list for transmission. Once all of the blocks have been read and differences in luminance determined, they may be transmitted from transmitter 210 to receiver 220 in order of greatest to smallest difference at step 308. Block transmission is then complete upon determination of some threshold, for example, minimum Δ luminance or upon some maximum number of transmitted blocks, according to bandwidth constraints. As illustrated in 215 of FIG. 2, each block update will be preceded by its location 215a in order for the receiver to determine which block to update in the current image to compute the updated image to be displayed. The set of steps taken by receiver 220 is illustrated and discussed with reference to FIG. 4. Process 300 then determines at step 310 whether there are any more images to be transmitted, and if so, returns to step 302 for processing of the next image. Once no more images are required to be transmitted, process 300 is complete.

Figure 4:
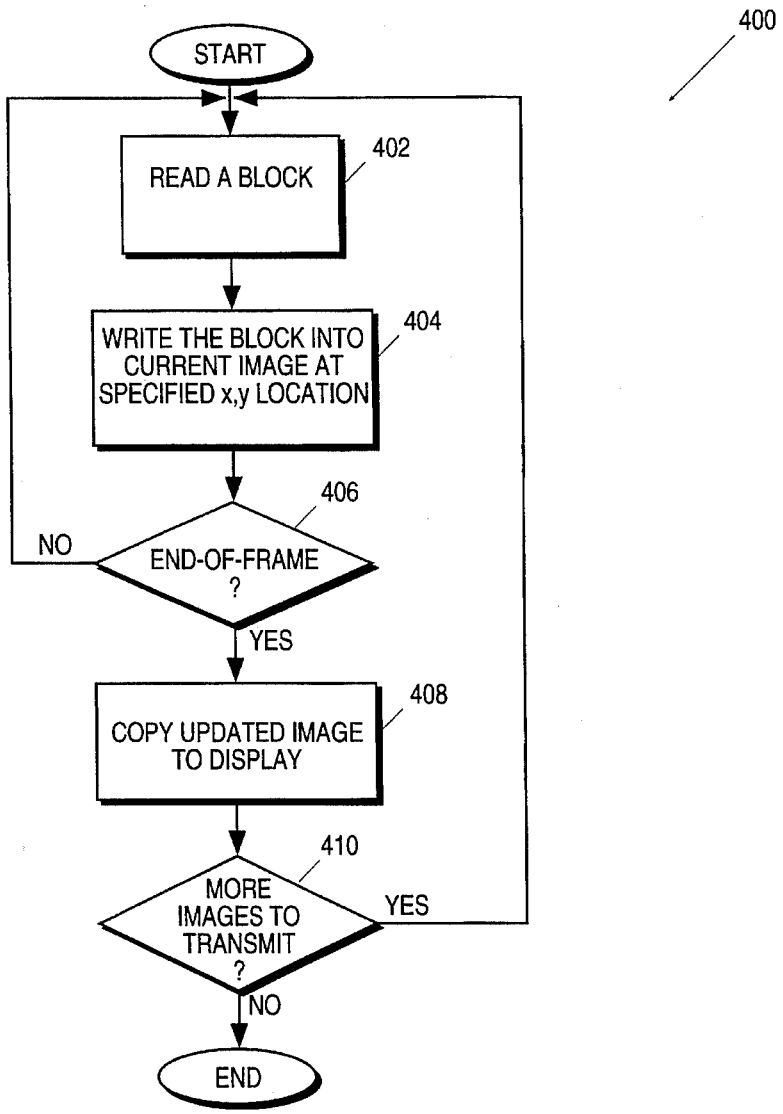
FIG. 4 illustrates a process for reception of the data which is transmitted from the process of FIG. 3.

Process 400 of FIG. 4 illustrates the steps taken by receiver 220 upon transmission of a frame of update blocks to a receiver for updating of an image contained within its local memory. Process 400 of FIG. 4 reads blocks as they are received at step 402. Once the block is received, it is written via location information 215a in each block the current image at the specified location at step 404. Then, upon completion of step 404, it is determined whether an end of frame signal has been received at step 406. If not, then steps 402 through 404 continue until the end of frame condition is detected at step 406. Upon completion of reading all update blocks, the current image has been updated to create the updated image and the updated image is then copied to the display at step 408. At this time, preferably at a given frame rate, the image is then ready to be displayed to the user to show the updated information.

Figure 5:
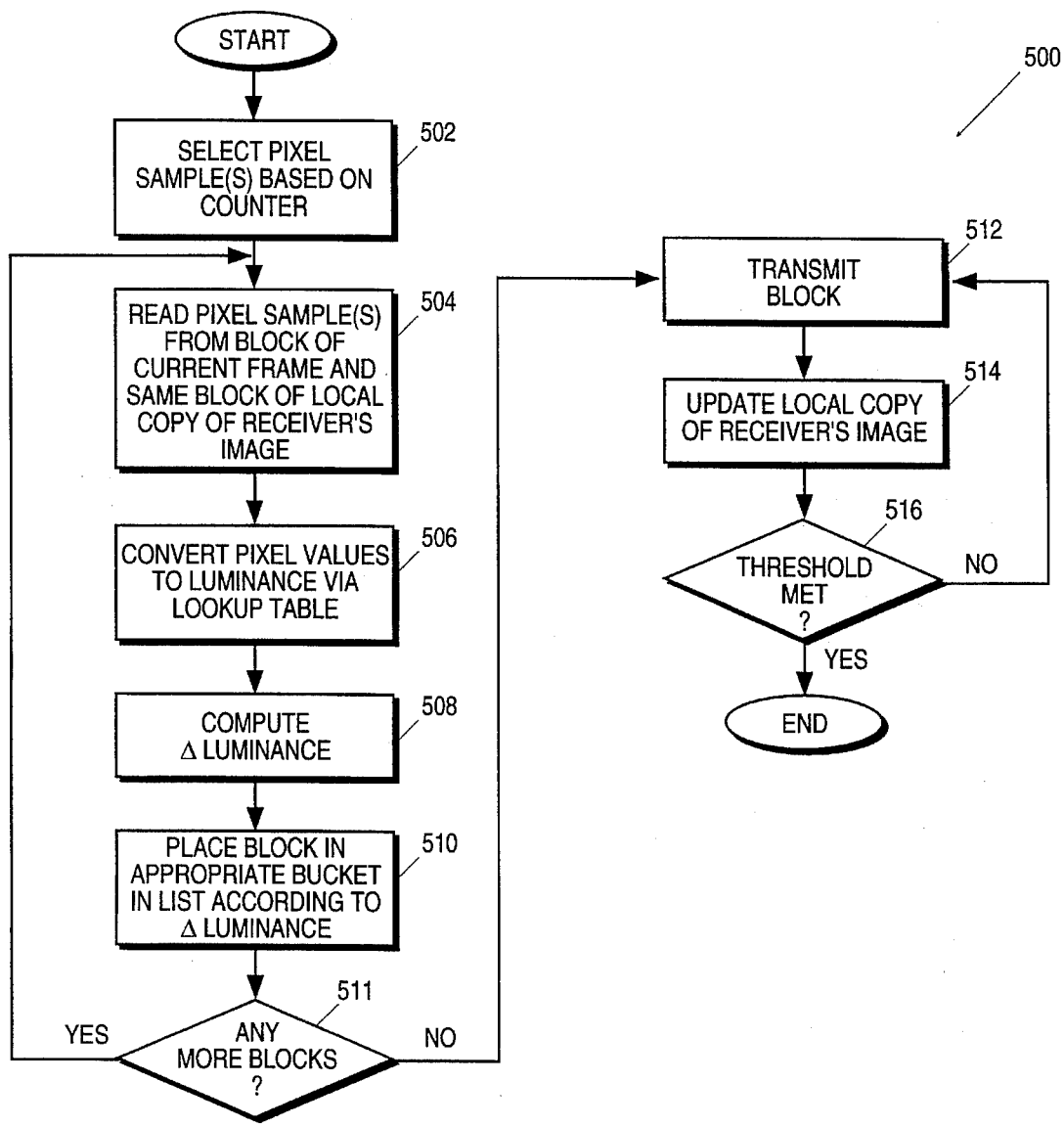
FIGS. 5 illustrates a more detailed sequence of steps which are used for determining which blocks of data to transmit from the transmitter to receiver as illustrated in the FIG. 3.

FIG. 5 shows process 500 which is a more detailed sequence of steps which are taken during process 300. As discussed previously, block changes are detected on a block by block basis by sampling pixels within a block, wherein the block typically has a fixed size such as 4×4 or 8×8 pixels. In implemented embodiments of the present invention, a pixel or group of pixels is selected from each block for determining the differences in luminance from frame-to-frame. The pixel or pixels selected for determining the change in luminance from frame-to-frame are based upon a rotating sample of each block in the current and the receiver's image. The rotating sample(s) (and for all blocks in the image, an even distribution of pixel samples across the image), which will be discussed in more detail below, ensure that there is an even distribution across the block of examined pixels to determine changes in luminance. The rotating sample or samples ensures that all pixels in each block of the image are uniformly examined over time and are spatially distributed throughout the block from sample-to-sample. This ensures that representative sample(s) for each block are examined over time, wherein all pixels are eventually sampled. The details of this rotating sample will be discussed in more detail below.

In the case of a single pixel sample from any given block, a simple difference is used for determining the change in luminance from the local copy of the receiver's image to the current image. In the case of a plurality of pixels being used for detecting the change in luminance, an average absolute change in luminance for each block is calculated. The average absolute block difference is calculated as follows:

$$\frac{\sum_{1}^{n} |C_i - P_i|}{n}$$

Wherein n is the number of samples (wherein n is preferably a power of 2), $C_i$ are the pixel samples from the current block being examined, and $P_i$ are the pixel samples from the block from the local copy of the receiver's currently-stored image. Other difference measures may be used, such as root means squared (RMS), or other measures, according to implementation.

Process 500 is a more detailed view of the process of determining the blocks which should be updated in the receiver, placing those blocks into a list which is sorted from greatest difference in luminance to smallest difference, and transmission of the blocks to the receiver. At step 502, the pixel sample(s) are determined based upon a counter. If multiple samples of the block are required, the counter should be incremented multiple times to retrieve each pixel sample position. The counter has as a maximum value the total number of pixels in the block size used in the image minus one. Thus, for a 4×4 block, the counter is initially set to 0 and is incremented until reaching 16, wherein it overflows and/or is reset. Then, at step 504, the selected pixels from the block of the current frame and the same spatial position of the local copy of the receiver's currently-stored frame are read at step 504. Then, at step 506, using a lookup table or other similar means in the transmitter, the eight bit RGB pixel values are converted to luminance values. If the pixel values were already represented in a chrominance/luminance encoding (e.g., YUYV), then no such conversion need take place. Then, at step 508, the average absolute difference in luminance is calculated. Once this information has been obtained for the block being examined, the block may then be placed into an appropriate bucket on a list for transmission at step 510. The sorting of the blocks from greatest difference to smallest difference is useful for transmitting those blocks which have changed the most first. A transmitter may then transmit blocks most changed to blocks least changed, in order of importance. Each transmission of a block occurs at step 512. The transmitter's local copy of the receiver's image is then updated at step 514. These two steps are performed for each block, until the threshold has been met at step 516 (e.g. a minimum difference of the block required for transmission, or maximum number of blocks transmitted), according to implementation.

The rotating sample may be determined in any number of ways, however, implemented embodiments of the present invention have unique advantages in that it ensures a uniform distribution of pixels across the block and the image. It also ensures that from frame-to-frame, the pixel samples are spatially distributed. The rotating sample of implemented embodiments of the present invention is discussed and illustrated with reference to FIGS. 6–9 and ensures that all pixels in each block are examined uniformly. The rotating sample of implemented embodiments of the present invention conserves computational resources over the prior art, and further, ensures uniform, spatially distributed, sampling across blocks in each image over time.

Figure 6:
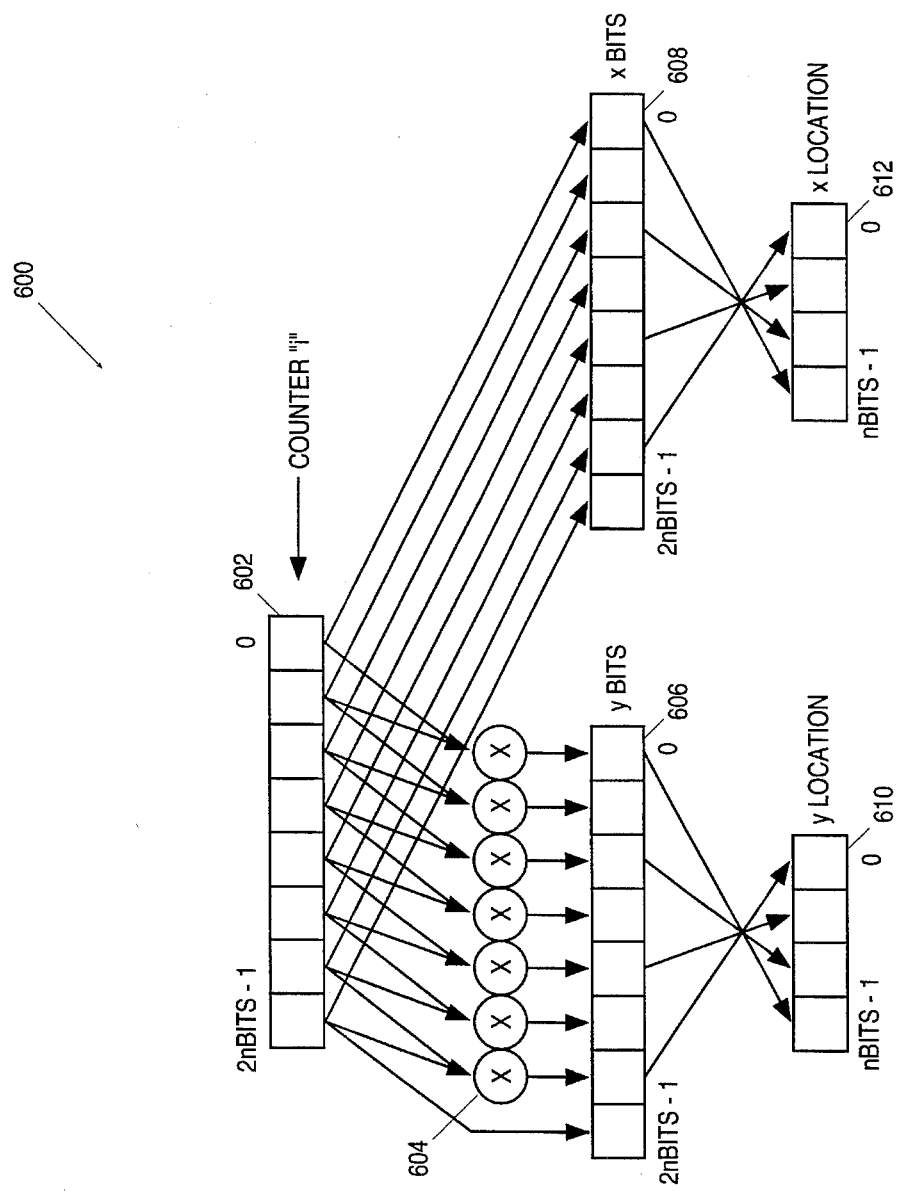
FIG. 6 shows a block diagram of circuitry which may be used to implement the rotating sample of an implemented embodiment of the present invention.

600 of FIG. 6 illustrates an example apparatus which may be used for ensuring uniform spatially-distributed pixel samples across each block. 600 illustrates either an apparatus which may be used for ensuring this uniform distribution over time periods as defined by counter 602, or alternatively, showing the functional results of a software-based uniform distribution method. 600 comprises a counter which may also be used for maintaining an index variable "i" 602 which is incremented to obtain each sample. For a single sample pixel per block, this would be incremented by one for each frame, however, for multiple samples per block, the counter will be incremented n times for each frame, obtaining a sampled pixel on each increment. The maximum value of the counter is the total number of pixels in a block minus one (e.g. 15 for a 4×4 pixel block, 63 for an 8×8 block or 255 for a 16×16 block). Counter 602 is input to a series of XOR functions 604 which XOR's each pair of bits contained within the counter. This is then passed to a second register 606 entitled yBits. Each of the odd bits in the yBits register 606 are then bit reversed and placed into a second register entitled ylocation 610 which is then used for determining the y position or row of the pixel being sampled from the block.

For determining the xlocation or column of the pixel in the block being sampled, as illustrated, each of the bits from counter 602 are passed into the xBits register 608 unchanged. Then, as with the yBits register 606, alternating bit locations in the register 608 are then bit reversed and passed to the xlocation register 612. This is used to reference the x location or column location of the pixel in the block. Then, using the xlocation register 612 and the ylocation register 610, a pixel may be referenced in the block by row and column. Upon each increment of the counter, overflow and then reset of the counter, uniform distribution and sampling of pixels within each of the blocks is thereby accomplished over time and in a spatially-distributed manner from frame-to-frame.

Figure 7:
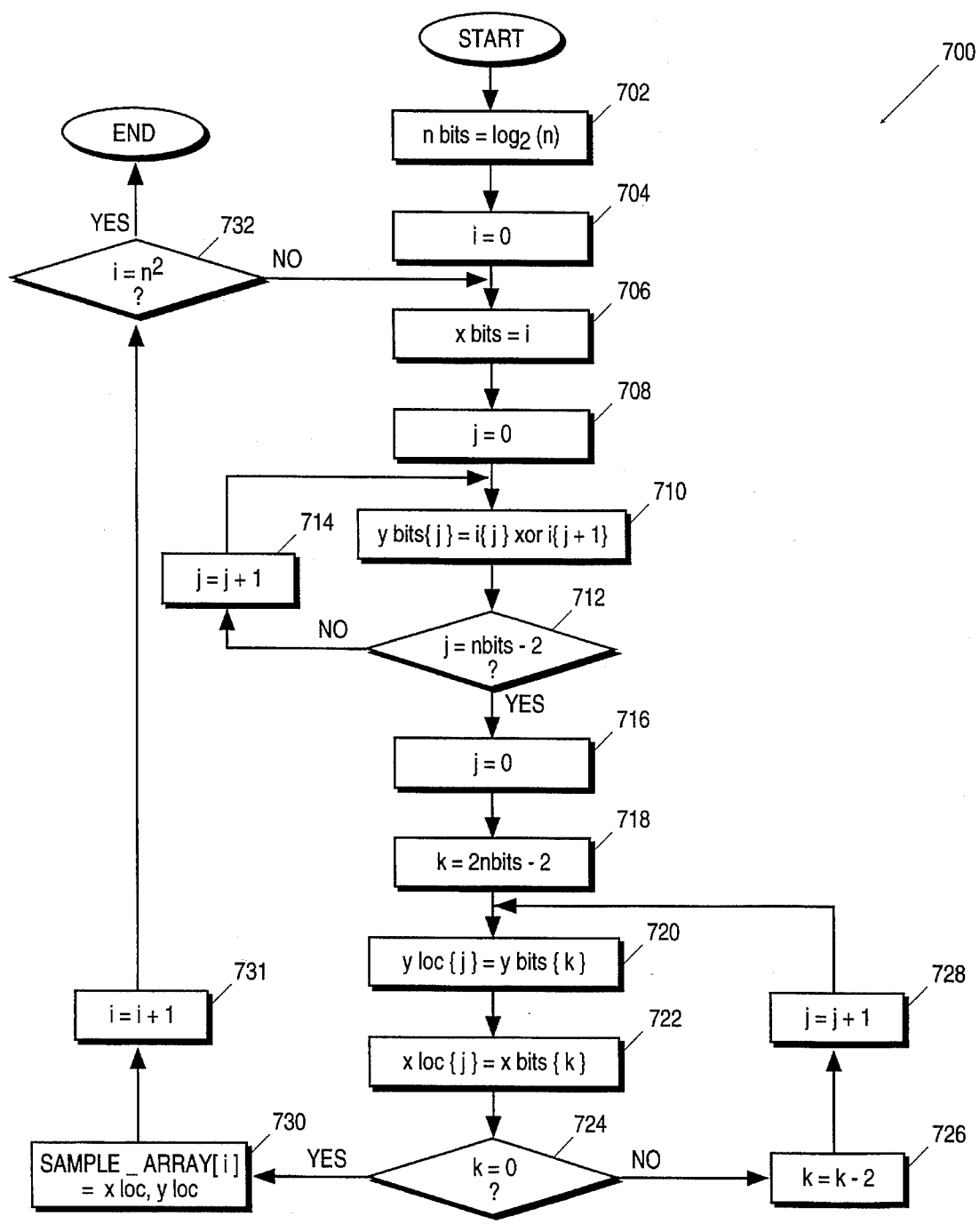
FIG. 7 illustrates a flow chart of a process which may be used for a rotating sample to determine which blocks to examine for determination of changes in luminance in a teleconferencing system.

Process 700 of FIG. 7 illustrates one process which may be used in a software implementation of the functional blocks illustrated as 600 in FIG. 6. To conserve processor overhead during runtime compression of image(s) (e.g. during a teleconference), process 700 is preferably performed as soon as the block size is known, typically, before commencement of a teleconference. In the flowchart, a single-dimension array is created SAMPLE_ARRAY, wherein each element contains two values, the x and y location (e.g. column and row) of the pixel sample. The array contains enough locations to reference each pixel location in a block, for example $n^2$, wherein n is the block size (e.g. 2, 4, 8 or 16).

Upon commencement of process 700, first the number of bits for representing one dimension of each location in the block is stored by performing a base 2 log of the block size n. Upon initialization of the counter i=0 at step 704, then the xBits variable is set to the value of the counter at step 706. Then, at step 708, a second index variable j is set equal to 0. Then, the first inner loop of the process may be commenced. Step 710 proceeds to perform an XOR function between adjacent bits contained within the counter. This is functionally equivalent to the XOR functions 604 in FIG. 6. (Note that the { } notation in the figure refers to a bit being referenced in the variable, and the [ ] refers to an element in an array). As each XOR function is performed at step 710, it is detected whether all of the bits have had this function performed upon them at step 712. If not, then the index j is incremented in step 714 and the process continues until all bits in the counter have had the function performed upon them. Upon completion of the loop 710 through 714, the variable yBits should contain XOR's of all adjoining bits in the counter as functionally illustrated in 606 of FIG. 6.

Finally, the last step which is required to be performed is the bit reversal of alternating bits within each of the yBits and xBits variables for determination of the xlocation and ylocation of the sampled pixel. This is illustrated with reference to steps 716 to 728. At step 716, the index variable j is initialized to zero, and at step 718, the index variable k is initialized to 2nbits–2. Then, each of the bits in the location variables yloc and xloc are set at steps 720 and 722. It is then detected, at step 724, whether the process is complete, that is, that k=0. If not, then process 700 proceeds to step 726. At step 726 the k index variable is decremented by two and the j index variable is incremented by one at step 728. The loop 720 through 728 continues until it is detected that k=0. Note that process 700 has been specifically illustrated for block sizes which are of a power of 2 (e.g., 2, 4, or 8), however, the process may be further generalized by extending it to other block sizes.

Upon detection that k=0 at step 724, the xlocation, ylocation variables can then be stored in the element SAMPLE_ARRAY[i]. Then, at step 731, the counter i is incremented and process 700 proceeds back to step 732 to determine whether the counter has now become equal to the maximum number of pixels $n^2$ in the block (for a 4×4 block—16). If not, then step 732 proceeds back to step 706. If so, then process 700 is complete.

Figure 8:
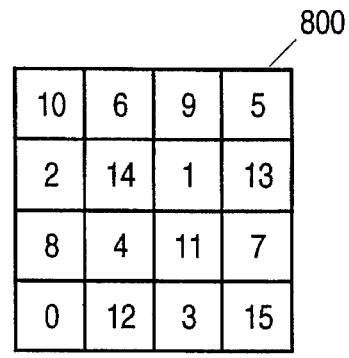
FIG. 8 illustrates a sequence of the rotating sample of pixels in a 4×4 block of pixels.

Thus, the use of process 700 either during runtime compression of images or during initialization of a sampling ensures that there is a uniform and regular distribution of pixel sample(s) in each block of the image. FIGS. 8 and 9 illustrate the sequence of pixels which are sampled in a 4×4 and 16×16 blocks. The numbers in each of the boxes of the two figures indicate the order in which they are sampled.

The method described with reference to FIG. 7 above may be implemented in an example programming language, such as the C Programming Language using the following code segment:

```
nBits = log2(n);
for (i=0; i < n*n; ++) {
    xBits = i;
    yBits = (i^(i>>1));
    x = y = 0;
    for (j = 0; j < nBits; j++) {
        x = x | (((xBits>>(2* (nBits–1)–2*j))&1)<<j);
        y = y | (((yBits>>(2* (nBits–1)–2*j))&1)<<j);
    }
    xLoc[i] = x;
    yLoc[i] = y;
}
```

This code segment is functionally equivalent to that illustrated FIGS. 6 and 7.

Although the rotating sample uniform distribution techniques described here are used, in implemented embodiments, for teleconferencing, that they have equal application to other areas of video processing. For example, these techniques may also be useful in fields such as, iterative rendering applications wherein large blocks are rendered initially and the process iterates to create a higher and higher resolution image by means of the herein described distribution of pixels. Thus, these techniques may be useful for any other applications which require uniform spatially-distributed samples of pixels over time.

Thus, a method and apparatus for sampling a uniform spatially-distributed sequence of pixels in a block, useful especially for applications such as teleconferencing, has been described. These techniques have particular advantages over the prior art, including but not limited to, those techniques using random pixel distribution samplings for determining changes between same spatial blocks in subsequent time periods. It is also more efficient than exhaustive techniques, such as those which sample every pixel in a block to determine the difference. Although the present invention has been described specifically with reference to very particular embodiments of FIGS. 1 through 9, it can be appreciated by one skilled in the art, that many departures, modifications, and other changes may be made without departing from the overall spirit and scope of the present invention. Thus, the above figures and descriptions are to be viewed an illustrative sense only, and not limit the present invention. The present invention is to be limited only by the appended claims which follow.

What is claimed is:

1. A computer-implemented method of transmitting images from a transmitter to a receiver, comprising the following steps:

a. said receiver maintaining a current image in a local storage;

b. said transmitter receiving an updated image for a next temporal time period;

c. said transmitter dividing said updated image into blocks;

d. said transmitter comparing a rotating sampled pixel of each of said blocks from said updated image with a sampled pixel from a local copy of said current image at a same spatial position of said sampled pixel;

e. said transmitter determining a difference between said rotating sampled pixel of each of said blocks from said updated image and said local copy of said current image and storing a reference to said block and associating said difference with said reference;

f. said transmitter sorting each of said blocks by said difference using said reference into a list of sorted blocks and associated differences;

g. said transmitter transmitting each of said blocks to said receiver in order of greatest of said differences to smallest of said differences until a first difference associated with a first block is less than a threshold;

h. said receiver receiving each of said blocks and updating said current image stored in said local storage by replacing each referenced block in said current image with each said received block to create an updated image in said receiver; and i. said receiver displaying said updated image.

2. The method of claim 1 wherein said difference is a difference of luminance between the rotating sampled pixel and luminance of sampled pixel from said local copy of said current image.

3. The method of claim 1 wherein said difference is an average absolute difference between a plurality of rotating sampled pixels and a plurality of sampled pixels from said local copy of said current image.

4. The method of claim 1 wherein said step of transmitting said blocks includes transmitting a spatial location of each of said blocks in conjunction with pixel values for said block.

5. The method of claim 4 wherein said step of replacing each referenced block includes using said spatial location of each of said blocks to determine which block in said current image to replace.

6. The method of claim 1 wherein said step of transmitting said blocks includes transmitting a skip code in conjunction with pixel values for each of said blocks to indicate a number of blocks in said current image to skip prior to updating a block in said current image in said receiver.

* * * * *